United States Patent [19]

Kauffman et al.

[11] Patent Number: 4,752,201

[45] Date of Patent: Jun. 21, 1988

[54] APPARATUS FOR INJECTION MOLDING FIBER-REINFORCED THERMOSET PLASTIC ARTICLES

[75] Inventors: Abe J. Kauffman, Millersburg; Robert S. Black, Southwest Massillon; Arthur J. Stanley, Ashtabula, all of Ohio

[73] Assignee: Trans Plastics, Inc., Conneaut, Ohio

[21] Appl. No.: 112,402

[22] Filed: Oct. 26, 1987

Related U.S. Application Data

[62] Division of Ser. No. 723,071, Apr. 15, 1985, Pat. No. 4,720,364.

[51] Int. Cl.[4] .............................................. B29C 45/02
[52] U.S. Cl. .................................... 425/145; 425/170; 425/171; 425/544; 425/561
[58] Field of Search ............... 425/145, 812, 147, 149, 425/150, 170, 171, 544, 547, 557, 561; 264/40.1, 40.5, 257, 328.4, 328.8, 328.11, 328.13, 328.18, 45.1, 255, 328.19

[56] References Cited

U.S. PATENT DOCUMENTS

| | | | |
|---|---|---|---|
| 3,278,992 | 10/1966 | Strauss | 425/544 |
| 3,723,037 | 3/1973 | Formo | 425/561 |
| 4,678,420 | 7/1987 | Inoue | 425/547 |

Primary Examiner—Jay H. Woo
Assistant Examiner—Timothy W. Heitbrink
Attorney, Agent, or Firm—Pearne, Gordon, McCoy & Granger

[57] ABSTRACT

A technique including an apparatus for injection molding fiber-reinforced thermoset plastic articles is disclosed. The technique includes forming a mixture of short lengths of reinforcing fibers with a thermosetting resin in a predetermined fiber-to-resin ratio and introducing the mixture to an injection molding cylinder. The volume of mixture introduced is at least a multiple of two of the volume of the mold chamber so that the injection plunger traverses the intersection between the molding cylinder and a stuffer cylinder a single time for a multiplicity of molding shots to minimize fiber breakage and balling. The injection plunger is adapted to precompact the mixture by being forced forward until a predetermined high pressure is sensed, indicating a hydraulically locked condition of the plunger wherein substantially all entrapped gases have been expressed from the mixture and there exists no substantial forward movement of the plunger. The position of the plunger in its precompacted position is noted and recorded so that further multiple injection shots may be made in predetermined volumetric amounts.

5 Claims, 1 Drawing Sheet

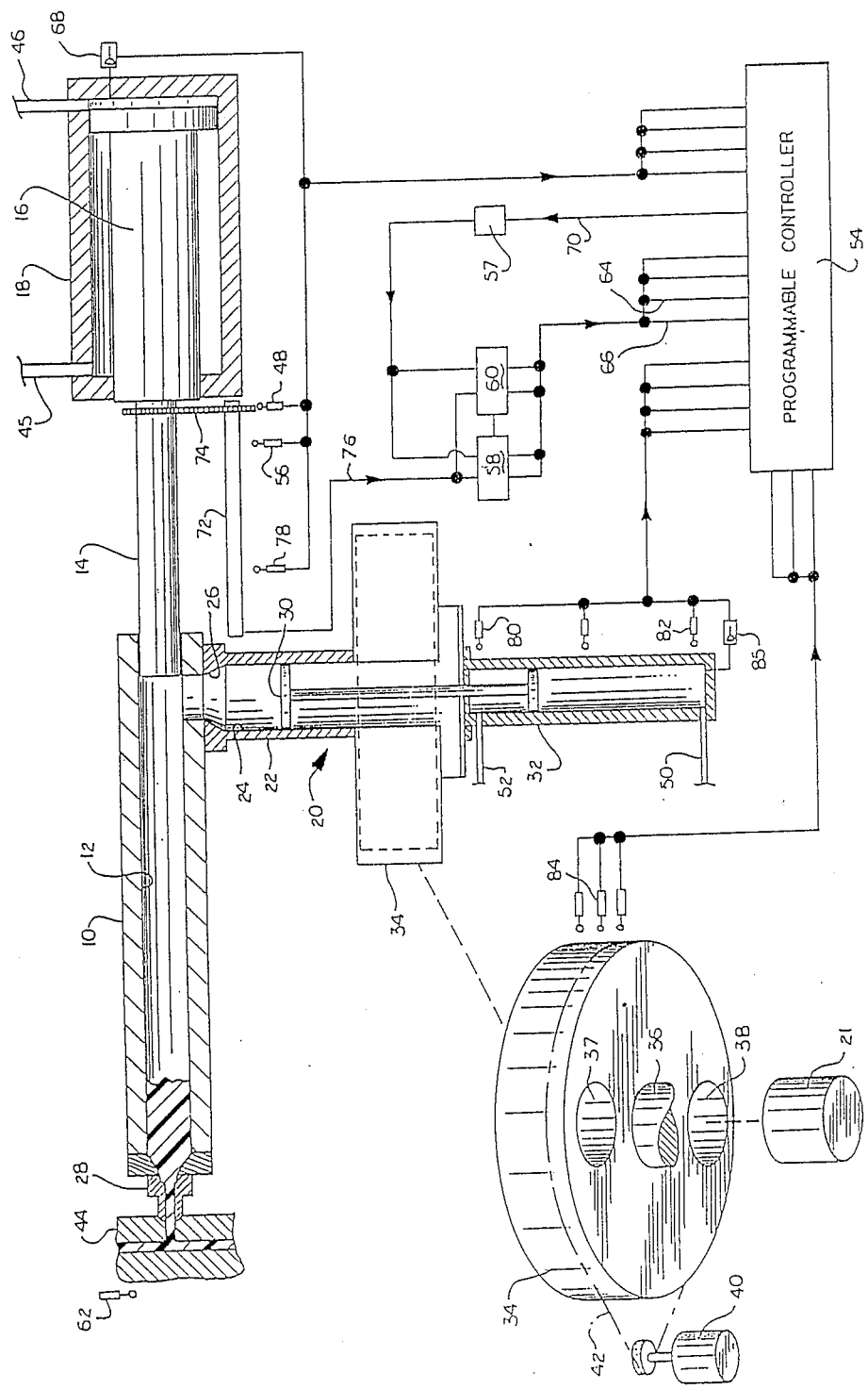

APPARATUS FOR INJECTION MOLDING FIBER-REINFORCED THERMOSET PLASTIC ARTICLES

This is a division of application Ser. No. 723,071, filed Apr. 15, 1985, now U.S. Pat. No. 4,720,364.

BACKGROUND OF THE INVENTION

This invention relates to a method and apparatus for forming fiber-reinforced thermoset plastic articles. In particular, the invention relates to a technique for forming such articles by a multiple shot technique wherein the injection ram does not traverse the stuffer passage in the injection cylinder at the end of each injection shot into the mold to thereby avoid degradation of the fiber reinforcement by cutting or balling as the injection ram shears the uncured resin mixture transferred from the stuffer unit to the injection cylinder.

This invention further relates to an injection molding technique which includes the step of precompacting the fiber/resin mixture to express gases therefrom prior to injecting sequential portions of the precompacted mixture into the mold cavity.

Various techniques have been employed to mold fiber-reinforced thermoset plastic articles. Those techniques include bag molding, centrifugal molding, hand lay-up, and sheet molding. Injection molding of such articles has been a fairly recent development as compared to the injection molding of thermoplastic plastic articles due to the process complexities which add to the cost of the finished articles. Injection molding techniques, however, produce articles having complex curvatures and details not possible by other molding techniques such as sheet molding techniques.

The injection molding of fiber-reinforced thermosetting resin is far more complicated than the injection molding of thermoplastic resins. One major distinction between the two is the fluidity characteristics of the resin systems. Liquid thermoplastic resins have a much lower viscosity than fiber-reinforced thermosetting resins. Thermoplastic resins generally have the fluidity characteristics of syrup, while fiber-reinforced thermosetting resins have the viscosity of modeling clay. While some thermosetting resins which are capable of being injection-molded have relatively low viscosities, those resins are not suited for applications involving a fiber-reinforced compound, since the low viscosity of the resin is incapable of carrying the fibrous reinforcement throughout the mold cavity in a uniform fashion if, indeed, they are capable of conveying the fibers through the injection nozzle.

In addition to the disparity in viscosities, the setting characteristics of the two resin systems are such that the thermoplastic resins need only be heated in the injection cylinder and then solidified by cooling in the mold. Thermosetting resins, on the other hand, must be carefully maintained at a predetermined temperature in the injection cylinder which is high enough to permit the injection of the reinforced plastic into the mold but not high enough to achieve cross-linking of the polymer. Molding pressures must also be closely controlled since they influence molding temperatures.

Fiber-reinforced thermosetting resins for injection molding purposes are usually employed in the form of bulk molding compounds (BMC) having the consistency of modeling clay. Bulk molding compounds offer simplified handling for high volume compression molders. BMC is a mixture of short (⅛ to 1-¼ inch) glass fibers and resin containing filler, catalyst, pigment, and other additives as required by the end use application. The material is premixed and can be provided in bulk form or can be extruded into rope or log-like forms for easier handling by high volume injection molders. Sheet molding compound (SMC) or thick molded compound (TMC) may also be employed.

Whether the bulk molding compound is injection-molded by a ram or by a screw technique, there are inherent complications which add to the difficulties involved in the injection molding of fiber-reinforced thermosetting resins. As is described in U.S. Pat. No. 4,280,972, the shear forces developed by a conventional plasticizing screw, or even a deeper flighted conveying screw, tend to break the glass fibers. This results in lower produce strength because the short, broken fibers are not as effective a reinforcing constituent as are longer fibers. In plunger or ram-type injection molding, the bulk molding composition is fed to the barrel of the injection molding machine by a feed or stuffer tube generally transverse to the axis of the injection barrel. Conventional molding techniques involve the retraction of the injection ram rearwardly of the feed tube opening, forcing a metered amount of molding compound from the feed or stuffer tube into the molding cylinder and driving the injection ram through its cylinder to inject the molding compound into the mold. This procedure is repeated for each injection shot and tends to break or shear the fibers at the intersection of the feed tube and the injection cylinder during each cycle. In addition to severing the fibers, it has been found that this action tends to form fibrous balls.

Prior art injection molding techniques further rely upon the travel of the injection plunger and a determination of the correct volume of resin injected into the mold. In practice, however, the resin and fiber mixture may not be fully compacted, but may contain pockets of air and/or other gases which are trapped during the fiber-resin blending operation.

SUMMARY OF THE INVENTION

This invention provides a method and apparatus for injection molding fiber-reinforced thermosetting resins such as, for example, BMC or SMC resins. The technique according to this invention is particularly adapted to molding large decorative and structural parts of, for example, 7 to 8 lbs or more. According to this invention, a charge of fiber-reinforced thermosetting resin, such as BMC or SMC, is charged into the injection cylinder of an injection molding machine through a stuffer cylinder. The total volume of the charge corresponds to a predetermined multiple of the calculated volume of the mold cavity plus a slight excess. The injection ram is advanced at a predetermined pressure past the stuffer opening in the injection cylinder until it meets the resistance of the molding compound in the cylinder, indicating that the injection cylinder is properly filled with the molding compound. When the resistance is met by the plunger, a predetermined detected increase in pressure initiates the operation of a timer which causes the injection plunger to dwell on the molding compound at a preselected, prepack pressure to cause the molding compound to unify in the injection barrel to allow gas and air to escape around the plunger. After a predetermined time period, the position of the injection plunger relative to the injection cylinder is referenced (preferably electronically) and the injection plunger is then retracted from its referenced position for a predetermined time period to decompress the molding compound in the injection barrel. The molding compound injected into the mold is then cured by the elevated temperature of the mold, the mold is opened, and the completed part is removed from the mold.

Since the injection barrel is initially charged with sufficient molding compound to provide a number of injection molding shots without repeated full retractions of the plunger past the stuffer opening to permit the injection cylinder to be refilled, succeeding injection shots are accomplished in the following manner. Since the initial injection shot established a prepacked condition in the molding compound within the injection barrel and the mold, and since the mold volume to be filled is a known quantity, movement of the plunger from its retracted position, through the referenced position, and to a position displacing the known mold volume, comprises the desired amount of plunger travel for the second injection shot. Thus, sequential shots may be made and the plunger may be backed off from its forward injection position to relieve pressure in the injection cylinder and each injection stroke may be precisely determined employing the initial prepacked reference point as a volume or displacement guide for each injection stroke.

BRIEF DESCRIPTION OF THE DRAWING

The drawing is a semi-schematic representation of an injection molding machine and its associated control system.

DETAILED DESCRIPTION OF THE INVENTION

Referring now to the drawing, there is illustrated an injection molding machine which is adapted to inject sequential shots of prepacked molding compound in a closed mold. The injection molding machine includes an injection cylinder or barrel 10 having an axial bore 12 therethrough. Reciprocally mounted in the bore 12 is an injection plunger 14 driven by a hydraulically operated piston 16 mounted within a hydraulic cylinder 18.

Thermosetting fiber-reinforced resin is charged into the bore 12 by a stuffer mechanism 20. The fiber-reinforced thermosetting resin may be in the form of BMC, which is available in cylindrical or log-shaped charges 21 having the consistency of modeling clay. The resin may also be fed into the injection molding machine in the form of SMC, but the material is less desirable in that it may be more difficult to handle during the loading procedure. The stuffer mechanism 20 includes a stuffer cylinder 22 having a bore 24 which includes a conical end portion 26 communicating with the bore 12 and transverse thereto. The communication between the bores 24 and 12 is adjacent the distal end of the cylinder 10 with respect to an injection nozzle portion 28 of the cylinder 10. Reciprocally mounted in the stuffer cylinder or bore 24 is a stuffer plunger 30 which is adapted to force charges of molding composition, such as the charge 21, into the bore 12 ahead of the retracted plunger 14. The stuffer plunger 30 is reciprocally driven by a hydraulic cylinder 32. A stuffer canister mounting drum 34 is rotatably mounted on an axis 36 which is parallel to the axis of the stuffer cylinder 22 so that stuffer canisters 37 and 38 mounted on the drum 34 may be moved alternately into the path of the stuffer plunger 30 and form a continuation of the stuffer cylinder 24. Sequential charges of thermosetting resin are loaded into a canister 37 or 38 and, with the stuffer plunger 30 fully retracted, the charge is brought into alignment with the cylinder 24 and the plunger 30 drives the charge forward and into the cylinder 12. While one charge is being driven in this manner, another charge may be loaded into the empty canister 37 or 38. The drum 34 may be oscillated by a hydraulic motor 40 which drives a chain 42 encircling the drum 34.

The thermosetting resin is injected into a closed mold 44 where heat is applied to set the resin and form a molded article. Only a portion of the mold 44 is illustrated, but it should be appreciated that such a mold may be part of a conventional toggle clamp or hydraulic arrangement, which ensures adequate closure pressure during the injection of the resin.

The injection molding machine according to this invention is capable of an automatic injection cycle. Prior to initiation of the automatic cycle, the bore 12 of the injection barrel 10 is preloaded with a predetermined volume of, for example, BMC to provide a sufficient volume of injection shots into the mold without repeated retractions of the injection ram or plunger 14 across the opening between the stuffer cylinder 24 and the injection cylinder 12, which would tend to shear or otherwise degrade the fibrous reinforcement of the molding composition. The injection plunger 14 is fully retracted hydraulically by pumps (not shown) which pressurize an inlet port 45 and exhaust fluid from a port 46 of the cylinder 18. Full retraction of the injection plunger 14 activates a limit switch 48, which initiates operation of a hydraulic pump (not shown) to admit fluid to a port 50 and exhaust fluid from a port 52 of the cylinder 32. This advances the stuffer plunger 30 through the stuffer canister 37 to advance the BMC contained therein to the injection cylinder 12. The duration of advance of the stuffer plunger 30 is determined by a timer (not shown) in a programmable controller 54. When the stuffer advance timer times out, the stuffer plunger 30 decompresses and the timing out of the timer causes the hydraulically driven piston 16 to advance the injection plunger 14 forward past the cylinder 24 to trip a limit switch 56. Operation of the limit switch 56 initiates the operation of a timer (not shown) in the controller 54 to advance the injection plunger 14 for a predetermined period of time. When the injection advance timer times out, the advance of the injection plunger 14 is terminated, and a pulse from the programmable controller 54 through an isolation relay 57 resets a pair of counters 58 and 60 to zero and initiates retraction of the injection plunger 14. Retraction of the injection plunger 14 continues until the limit switch 56 is again actuated or a prepack decompression timer (not shown) times out, whichever occurs first.

Full retraction of the injection plunger 14 again operates the limit switch 48 to advance the stuffer plunger 30 to thereby force another charge of BMC into the injection cylinder 12 from the canister 38, which was loaded with BMC after retraction of the stuffer plunger 30 and during the advance of the injection plunger 14 and rotated in place by the hydraulic motor 40 and its chain 42. The foregoing procedure is repeated manually until the BMC drools through the injection nozzle 28 and out of the mold runners of the open mold 44. The injection press is now ready for the molding cycle.

After the cylinder 12 has been loaded with BMC in the foregoing manner, the mold 44 is closed, actuating a limit switch 62 to thereby initiate the injection cycle.

Operation of the limit switch 62 initiates operation of one or more of the hydraulic pumps (not shown) to supply fluid to the port 46 and exhaust fluid from the port 45 to thereby drive the piston 16 forwardly. The number of hydraulic pumps selected for operation depends upon the desired injection feed rate of the plunger 14. The counters 58 and 60 have an input 64 to the controller 54 to limit the number of hydraulic pumps operating on the cylinder 18 to one low volume pump, causing the plunger 14 to slow down and stop accurately when an input 66 from the counters 58 and 60 is energized as the end of an injection shot is approached.

The plunger 14 advances past the limit switch 56 until it meets the resistance of the molding compound in the cylinder 12. This causes a pressure increase in the cylinder 12 which, at a predetermined value, actuates a pressure switch 68 to sense the predetermined pressure behind the piston 16. Actuation of the pressure switch 68 initiates operation of an adjustable prepack timer (not shown) in the controller 54. The pressure switch 68 serves to control the hydraulic pumps to maintain the pressure behind the piston 16, and therefore the pressure of the plastic within the cylinder 12 at the predetermined set pressre of the switch 68. The plunger 14 therefore dwells on the molding compound at the preselected prepacked pressure for the duration of the prepack timer setting. This causes the molding compound to unify in the injection cylinder 12 and allows gas and air to escape around the tip of the plunger 14. When the prepack timer times out, the controller 54 pulses an output 70 to the isolation relay 57 to thereby reset the counters 58 and 60 to zero. Also, when the prepack timer times out, the injection plunger 14 is slightly retracted until a prepack decompression timer (not shown) in the controller 54 times out, releasing the pressure on the molding compound in the injection barrel but leaving the compound in a compressed, densified condition. The position of the plunger 14 prior to decompression retraction establishes a zero reading on the counters 58 and 60, and establishes a reference point for each of the following series of injection molding operations. When the plunger is retracted for decompression, the counters 58 and 60 indicate a negative display showing a displacement from the reference point which has been established for succeeding injection shots into the mold 44. It should be appreciated that the retraction operation is merely to relieve the pressure on the plastic in the cylinder 12 so that the plastic will not drool or be expressed from the injection nozzle 28 and/or mold runners when the mold 44 is opened and a cured part is removed therefrom.

After curing the molded part by the application of heat to the mold and after removal of the molded part, closure of the mold once again initiates an injection cycle. The injection plunger 14 moves forward in an amount corresponding to the distance it moved during decompression to and then beyond the zero or referenced position indicated by the counters 58 and 60. Further movement past the zero or reference point necessary to inject a predetermined volume of compound into the mold 44 is determined by a microscale transducer 72, as will be explained. As a safety feature, the injection timer is set to time out shortly after the expected travel duration of the plunger 14. After that injection shot, the injection plunger again decompresses to permit the mold to be opened without drooling compound from the injection nozzle, but the extent of travel of the injection plunger is noted and retained by the counters so that the next and other injection shots may be identical in volume as ultimately measured from the initial zero set point on the counters.

Input to the counters 58 and 60 as to the position of the injection plunger 14 is provided by a microscale transducer 72 which is operated by an actuator 74 (which may also operate the limit switches 48, 56, and 78) on the plunger 14. The position signal from the microscale 72 is transmitted to the counters 58 and 60 by an input 76.

The repeated injections continue until a limit switch 78 is actuated, indicating the need to refill the cylinder 12 by the stuffer plunger 30. Once the limit switch 78 is actuated during an injection cycle, the plunger 14 is retracted fully, actuating the limit switch 48, which initiates advance of the stuffer plunger 30 for a time period determined by the stuffer timer (not shown) in the controller 54, thereby preloading or prepacking the injection barrel 12 at a predetermined pressure with molding compound from the stuffer cylinder 24. If during the advance of the stuffer plunger 30 a limit switch 80 is actuated, causing the injection plunger 14 to advance until the limit switch 56 is actuated, the plunger 14 is caused to complete its prepack cycle and then retracts so that the front end of the injection plunger 14 blocks the opening between the cylinders 24 and 12. Actuation of the limit switch 80 also fully retracts the stuffer plunger 30 to actuate a limit switch 82, causing the hydraulic motor 40 to rotate the stuffer loading canisters 37 and 38 to their opposite positions, aligning the previously loaded canister of molding compound with the stuffer cylinder 24 and actuating a limit switch 84, stopping rotation of the drum 34. The plunger 30 is then advanced until it meets the resistance of the molding compound, increasing the hydraulic pressure within the cylinder 32 to actuate a pressure switch 85 at a predetermined pressure. Actuation of the pressure switch 85 initiates operation of a stuffer forward timer (not shown) to compress and unify the molding compound transferred to the stuffer cylinder 24. When the stuffer forward timer times out, the stuffer plunger 30 is allowed to back off from its forward position to decompress the compound, permitting the mold 44 to be opened.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

We claim:

1. Apparatus for injection molding fiber-reinforced thermoset plastic articles, comprising:
    means defining an injection molding cylinder;
    means to convey a mixture of short lengths of reinforcing fibers and a thermosetting resin to said molding cylinder;
    means defining a mold cavity at one end of said injection molding cylinder and in fluid communication therewith, said mold cavity having a predetermined volumetric capacity with the volumetric capacity of the injection cylinder exceeding the volumetric capacity of said mold cavity by a factor of two;

plunger means reciprocal in said injection molding cylinder for compressing the mixture to a relatively high pressure and to a substantially compressible condition to substantially completely drive out any entrapped gases and to establish a reference volume in said cylinder;

power means to advance and retract said plunger;

recording means to detect and record an initial position of said plunger when said reference volume is established;

sensing means responsive to the attainment of said high pressure to maintain said pressure for a predetermined time period;

means to cure the thermosetting resin in said mold cavity;

means responsive to the termination of said time period to slightly retract said plunger to relieve said pressure; and means responsive to closure of said mold to advance said plunger past said initial plunger position and to a second position sufficient to reduce the volume of the injection cylinder by an amount corresponding to the volumetric capacity of the mold cavity.

2. Apparatus according to claim 1, including a stuffer mechanism for introducing said mixture to said molding cylinder, said mechanism including a stuffer cylinder having a longitudinal axis, said stuffer cylinder intersecting with said molding cylinder, means for causing full retraction of said plunger past the intersection between the stuffer cylinder and molding cylinder only after substantially all of the volumetric capacity of the injection cylinder has been reduced by the injection plunger.

3. Apparatus according to claim 2, including means to feed said mixture through said stuffer cylinder to said molding cylinder which includes a stuffer plunger adapted to reciprocate in said stuffer cylinder.

4. Apparatus according to claim 3, including means responsive to the full retraction of said injection plunger to advance said stuffer plunger and to force said mixture into said molding cylinder.

5. Apparatus according to claim 4, wherein said means to feed said mixture further includes a rotatable drum, said drum having an axis of rotation parallel to the longitudinal axis of said stuffer cylinder, a plurality of stuffer canisters in said drum and having axes parallel to the longitudinal axis of said stuffer cylinder, said drum being interposed between the stuffer cylinder and the stuffer plunger when said stuffer plunger is in its fully retracted position so that each canister may be sequentially rotated in axial alignment with said stuffer plunger and said stuffer cylinder to form a continuation of said stuffer cylinder.

* * * * *